April 7, 1953 E. C. ALLEN ET AL 2,633,955
SYNCHRONIZING CLUTCH
Filed Nov. 3, 1949

Inventors
Ernest C. Allen
Edward Scheuermeier
by George M. Albuck
Attorney

Patented Apr. 7, 1953

2,633,955

UNITED STATES PATENT OFFICE 2,633,955

SYNCHRONIZING CLUTCH

Ernest C. Allen, Wauwatosa, and Eduard Scheuermeier, Milwaukee, Wis., assignors to Allis-Chalmers Manufacturing Company, Milwaukee, Wis., a corporation of Delaware Application November 3, 1949, Serial No. 125,320

6 Claims. (Cl. 192—53)

This invention relates to automatic couplings for rotary units and more particularly to positive synchronizing clutches. A principal object of the invention is the provision of new and improved apparatus of this type.

To establish a positive torque transmitting connection between a pair of rotating clutch elements without clashing of clutch teeth, it is requisite that the elements which are to be interconnected be brought to the same rotational speed and complementary parts thereof aligned before meshing of the clutch teeth. It has been proposed to effect positive synchronism and alignment of complementary parts through the engagement of guide teeth carried by a main clutch member with a positive torque transmitting connection provided therebetween. Such devices, however, are open to the objection that imperfect synchronism will, upon initial engagement, cause the guide teeth to be subjected to tangential impact, the magnitude of which will be determined by the mass of the rotating members to be coupled and their relative rotational speeds. Such impacts will greatly reduce the useful life of the teeth.

It is therefore an object of this invention to provide an improved clutch structure which will effect synchronism and alignment of complementary parts and which will not be subject to the aforementioned objection. This invention contemplates the provision of resilient driving means between a main clutch member and guide teeth carried thereby.

Another object of this invention is the provision, between a main clutch member and a synchronizing mechanism, of resilient driving means and of positive driving means which will supersede the resilient means when a predetermined loading is reached, the positive drive being effective to insure a definite angular relation between complementary clutch parts.

Another object of this invention is to provide a form of a fluid pressure operable positive synchronizing clutch in which movement of the synchronizing mechanism toward the clutched position precedes movement of the main clutch member in a definite relation. This type of clutch has been disclosed and claimed broadly in the copending application of Ernest C. Allen, Serial No. 125,318, filed November 3, 1949. To this end, it is one aim of the invention to provide a clutch having separate fluid pressure operable actuating means for imparting axial movement to a synchronizing mechanism and to a main clutch member with passage means interposed between the actuating means to permit a restricted flow of liquid from the synchronizing mechanism actuating means to the main clutch actuating means.

Other objects will appear hereinafter as the description of the invention proceeds.

The novel features of the invention and how the objects are attained will appear more fully from this specification and the accompanying drawing showing one embodiment of the invention and forming a part of this application, and all the novel features are intended to be pointed out in the claims.

Figure 1:
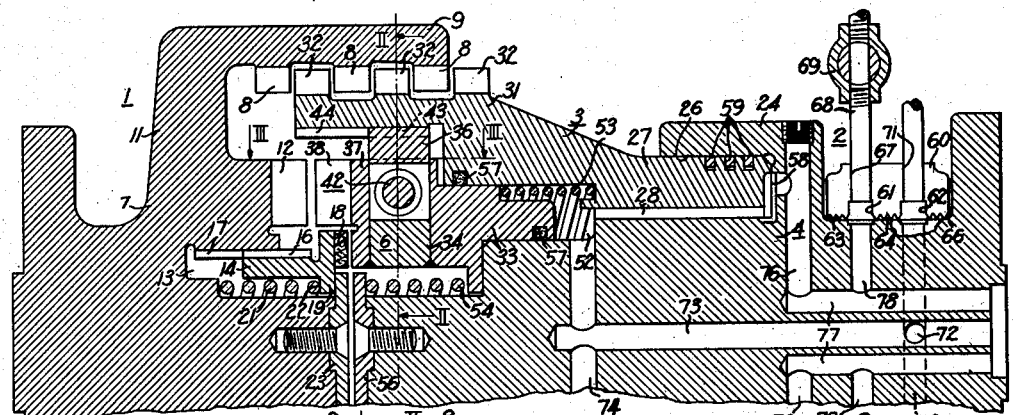
Fig. 1 is a fragmentary longitudinal section of a clutch embodying this invention with the parts thereof in the unclutched position.

Referring to the drawing, in Fig. 1 is shown a synchronizing clutch comprising a first rotary unit 1 coaxially arranged with a second rotary unit 2. The second unit 2 includes a positive clutch member 3 carried by a hub 4 to rotate therewith and axially slidable thereof to engage the first rotary unit 1. A first torque transmitting element 6 is slidably carried by the hub 4 of the second unit 2 and is axially shiftable into engagement with the first rotary unit 1 through synchronizing means 12, 38 to provide a synchronizing torque between the first rotary unit 1 and the positive clutch member 3, such torque being transmitted from the first torque transmitting element 6 to the positive clutch member 3 through a second torque transmitting element 36 interposed therebetween.

The first rotary unit 1 comprises a body portion 7 adapted to be connected to a driving or driven mechanism (not shown) in any suitable manner and provided with positive clutch means of any suitable form which are here shown as a plurality of axially spaced annular rows of clutch teeth 8 carried on the inner periphery of an axially extending flange 9 which in turn is carried by a radially extending flange 11 formed on the body portion 7. Clutching elements of the type herein illustrated are fully disclosed and claimed in the copending application of Ernest C. Allen, Serial No. 125,319, filed November 3, 1949.

Figure 3:
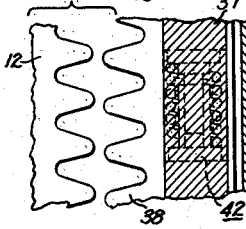
Fig. 3 is a fragmentary development taken on the line III—III of Fig. 1.

Formed on the face of the body portion 7 adjacent the second rotary unit 2 is an annular row of guide teeth 12 disposed on radii of the body portion and extending toward the second unit. The guide teeth 12 may be of any suitable shape and are shown in Fig. 3 as having a cross section which is tapered from the root portion outward to a rounded tip. Adjacent the inner periphery of the row of guide teeth 12, an annular recess 13 is formed in the body portion to slidingly receive a generally annular element 14, the outer periphery of the element being provided with splines 16 which coact with splines 17 formed in the outer peripheral wall of the recess 13. An annulus of friction material 18 is bonded to a flange 19 formed on the element 14 and a spring 21 disposed in the recess 13 engages a shoulder 22 formed on the inner periphery of the element 14 to bias the element axially toward the second rotary unit 2. Axial movement of the element 14 under the influence of the spring 21 is limited by a plate 23 secured to the body portion 7 and extending radially beyond the inner peripheral wall of the recess 13.

The second rotary unit 2 comprises the hub 4 adapted to be secured by any suitable means to a driving or driven mechanism (not shown) and provided with an enlarged medial portion 24. An axially extending annular recess 26 is formed in the medial portion 24 for the reception of a reduced end portion 27 of the generally barrel shaped positive clutch member 3 provided on its inner periphery with splines 28 which coact with splines 29 formed in the inner peripheral wall of the recess 26 to permit the positive clutch member 3 to slide longitudinally of the hub 4 while rotating therewith.

Figure 4:
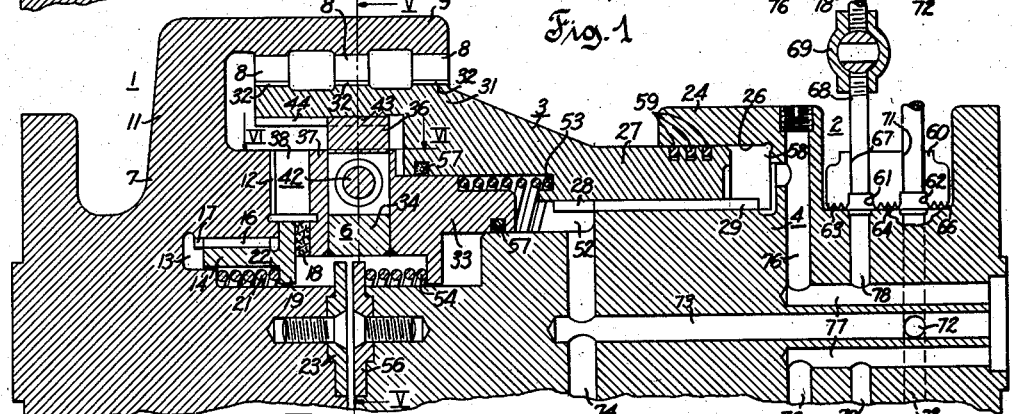
Fig. 4 is a fragmentary longitudinal section of the clutch shown in Fig. 1 with the parts thereof in the clutched position.

The end portion 31 of the clutch member 3 which is opposite to the reduced end portion 27 is provided on its outer periphery with positive clutch means, here shown as a plurality of axially spaced rows of clutch teeth 32 which are complementary with the clutch teeth 8 carried by the first rotary unit 1. The rows of clutch teeth 32 are disposed adjacent the rows of clutch teeth 8 with freedom for relative rotation therebetween when the clutch is in the unclutched position as shown in Fig. 1. It will be apparent that axial movement of the clutch member 3 will cause the teeth 32 to mesh with the teeth 8 (as shown in Fig. 4) to establish a positive torque transmitting connection between the first rotary unit 1 and the second rotary unit 2.

Interposed between the positive clutch member 3 and the first rotary unit 1 is the first torque transmitting element 6, the second torque transmitting element 36 and the synchronizing means 12, 38. The first torque transmitting element 6 comprises a generally annular piston 33 slidably carried in the space between the medial portion of the clutch member 3 and the hub 4. A ring 34 abuts the left side of the piston 33 and an annulus 37 abuts the left side of ring 34. The annulus 37, ring 34 and piston 33 are fusibly united together. The second torque transmitting element, shown as the ring 36, is mounted concentrically about the first torque transmitting element 6 with freedom for limited rotation relative thereto as will subsequently be described.

The second torque transmitting element 36 is restrained from axial movement relative to the first torque transmitting element 6 by the outer portion of the annulus 37 which holds the second torque transmitting element 36 against an outer portion of the piston 33. Synchronizing means 12, 38 are here shown as teeth 38 carried by the annulus 37 of the first torque transmitting element 6, and teeth 12 carried by the first rotary unit 1.

Figure 2:
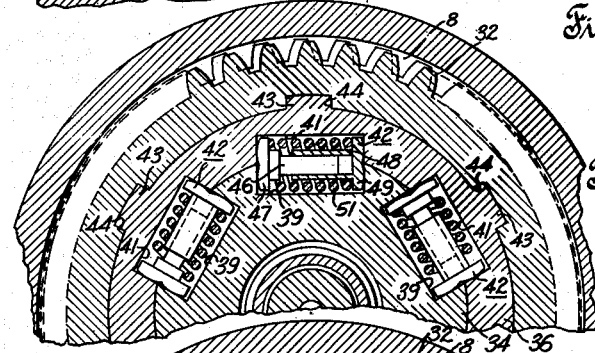
Fig. 2 is a fragmentary section taken on the line II—II of Fig. 1 looking in the direction of the arrows.
Figure 5:
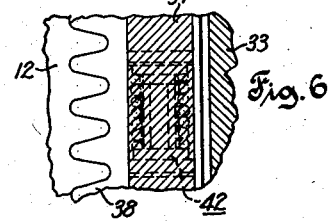
Fig. 5 is a fragmentary section taken on the line V—V of Fig. 4 looking in the direction of the arrows.

As shown in Figs. 2 and 5, the ring 34 of the first torque transmitting element 6 is provided with a plurality of angularly spaced rectangular notches 39 in its outer periphery and the second torque transmitting element 36 is provided with a plurality of corresponding notches 41 in its inner periphery. The notches 39 and the notches 41 form pockets in which are disposed compression members 42 which comprise drive means for transmitting torque from the first torque transmitting element 6 to the second torque transmitting element 36 as will more fully appear. The second torque transmitting element 36 is provided with a plurality of splines 43 on its outer periphery which are disposed in axially slidable torque transmitting relation with the clutch member 3, extending into complementary axially extending grooves 44 formed in the inner periphery thereof.

All the compression members 42 are identical and a description of one will suffice to show the structure of all. Each compression member may comprise a cylindrical element 46 provided with a flanged end or head portion 47 and telescoped into a tubular element 48 which is also provided with a flanged end or head portion 49. A spring 51 encompasses the telescoped portions of the elements 46, 48 and bears against the head portions 47, 49 to bias the elements in elongated direction, elongation of the compression member 42 being restricted to the limits defined by the walls of the notches 39, 41. In operation, the compression members 42 will maintain the notches 39 in radial alignment with the notches 41 when the clutch is in the unclutched position as shown in Fig. 2. However, when the first torque transmitting element 6 is moved axially toward the first rotary unit 1 and the teeth 12, 38 of the synchronizing means are meshed with each other, relative rotation between the first and second units will cause a synchronizing torque to be transmitted through the synchronizing means 12, 38 to ring 34 of the first torque transmitting element 6, thence through the springs 51 to the second torque transmitting element 36 and thence to the main clutch member 3 through the splines 43. It will be apparent that the tangential forces on teeth 38 of the synchronizing means at incipient meshing under such conditions will not result in deformation of the teeth but rather will cause the teeth and associated first torque transmitting element 6 to rotate relative to the second torque transmitting element 36 to compress the springs 51 to a point where they will carry a load sufficient to overcome the inertia resulting from the differential in the angular velocities of the mechanisms to be coupled. The springs 51 may be of such strength that they will be compressed to a point which will permit the end of each tubular element 48 to abut the head portion 47 of its companion cylindrical element 46 when the synchronizing means 12, 38, first torque transmitting element 6 and second torque transmitting element 36 are transmitting a predetermined proportion of full load; for example, 5%. When such a load condition is attained, the compression members 42 will be in the positions shown in Fig. 5 with the abutting elements 46, 48 providing a positive drive between the first and second torque transmitting elements 6, 36 and with a positive torque transmitting connection existing between the meshed teeth of the synchronizing means 12, 38 and the main clutch member 3. It is desirable that the angular relation between the positive clutching means 8, 32 and the synchronizing means 12, 38 be such that the clutch teeth 32 will be axially aligned with the spaces between the clutch teeth 8 when such a positive torque transmitting connection exists between the synchronizing means 12, 38 and the clutch member 3.

The medial portion of the positive clutch member 3, the piston 33 and the hub 4 define first fluid pressure actuating means here shown as an annular pressure chamber 52 to which fluid under pressure may be admitted to move the piston axially relative to the hub and toward the first rotary unit I. Force exerted on the piston 33 by fluid under pressure in the chamber 52 is supplemented by first bias means here shown as a spring 53 disposed in the chamber 52 to engage the piston 33 and the clutch member 3. The piston 33 is biased away from the first rotary unit I or toward the right by a second bias means here shown as spring 54 which engages the piston and a plate 56 secured to the end of the hub 4. The spring 54 is of such strength that it will overcome the bias of the spring 53. Sealing means of any suitable type may be interposed between the piston 33 and the walls of the pressure chamber 52 to prevent leakage of fluid under pressure therefrom, such sealing means being here shown as rings 57.

The space between the reduced end 27 of the clutch member 3 and the bottom of the annular recess 26 forms a second fluid pressure operating means here shown as an annular pressure chamber 58 to which fluid under pressure may be admitted to move the clutch member 3 axially of the hub 4 against the bias of the spring 53 and into engagement with the first rotary unit. Sealing means of any suitable type, here shown as rings 59, may be interposed between the clutch member 3 and the outer wall of the recess 26 to prevent leakage of fluid under pressure therefrom.

A stationary slip ring 60 encircles one end of the hub 4 and is provided on its inner peripheral portion with a pair of annular grooves 61, 62 and three labyrinth sealing structures 63, 64, 66 which abut the periphery of the rotatable hub 4, the grooves 61, 62 being disposed respectively between the labyrinth structures 63, 64 and 64, 66. A radially extending bore 67 is formed in the ring 60 to communicate with the groove 61 and with a conduit 68 which in turn communicates with a drain (not shown). A valve 69 of any suitable type is interposed in the conduit 68 between the bore 67 and the drain. A second radially extending bore 71 is formed in the ring 60 to communicate with the groove 62 and with a source of fluid under pressure (not shown). A plurality of radially extending bores 72 formed in the hub 4 communicate with the groove 62 and with an axially extending bore 73 formed in the hub which in turn communicates with the pressure chamber 52 through a plurality of radial passages 74 formed in the hub. The pressure chamber 58 communicates with a plurality of radial passages 76 formed in the hub 4 to communicate with a pair of axial passages 77 which in turn communicate with the groove 61 through a plurality of radially extending bores 78.

The splines 28, 29 extend from the pressure chamber 52 to the pressure chamber 58, the spaces between the splines providing communication therebetween and comprising passage means for conveying fluid under pressure from the pressure chamber 52 to the pressure chamber 58.

Figure 6:
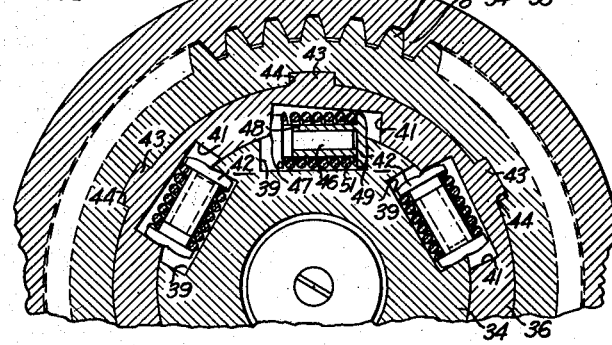
Fig. 6 is a fragmentary development taken on the line VI—VI of Fig. 4.

Assume that the clutch parts are in the position shown in Fig. 1, that the first unit I is rotating and it is desired to establish the clutched relation as shown in Fig. 4. The second unit 2 is brought up to substantially the same rotational speed as the first unit by any suitable motor means, not shown, and fluid under pressure is admitted to the pressure chamber 52 through the bore 71, groove 62, bores 72, 73 and passages 74. As the pressure in the pressure chamber 52 builds up, the first torque transmitting element 6 is moved to the left against the bias of the spring 54 and the annulus 37 engages the friction material 18 to transmit a preliminary synchronizing torque. Further axial movement of the first torque transmitting element 6 effects the compression of the spring 21 to increase the torque transmitted through the friction element and moves the synchronizing means 12, 38 into engagement and a synchronizing torque is transmitted through the springs 51 of the compressive members 42 to the clutch member 3 as hereinbefore described. An increase in load at this point will cause the compression members 42 to be compressed to the stage where they provide a positive drive as shown in Figs. 5 and 6. As hereinbefore pointed out, when resilient drive has been superseded by positive drive, the complementary parts of the main driving clutch, that is, positive clutch means 8, 32, are aligned and perfect synchronism has been achieved. While movement of the first torque transmitting element 6 to cause engagement of the synchronizing means 12, 38, is being effected, fluid under pressure flows from the pressure chamber 52 through fluid pressure control means including the splines 28, 29 to the pressure chamber 58 thence through the passages 76, 77, the bores 78, 67, the conduit 68 and the valve 69 to the drain (not shown). When synchronism is achieved, the valve 69 may be operated to close the conduit 68 and cause the pressure to build up in the pressure chamber 58 which in turn will cause the clutch member 3 to be moved to the left against the bias of the spring 53, the clutch teeth 32 meshing with the clutch teeth 8. The lag between the engagement of the synchronizing means 12, 38 and the positive clutch means 8, 32 may, if desired, be produced without manipulation of the valve 69 by admitting fluid under pressure to the chamber 52 with the valve closed; the rate at which the pressure in the chamber 58 builds up will then depend on the rate at which fluid under pressure flows along the splines 28, 29.

Assume that the clutch is in the clutched position as shown in Fig. 4 and it is desired to effect the unclutched relation. Communication is established between the chamber 58 and the drain through the passages 76, 77, the bores 78, 67 and the valve 69; as the pressure in the chamber 58 drops, the spring 53 will move the clutch member 3 to the right to the unclutched position shown in Fig. 1. Fluid under pressure will flow from the pressure chamber 52 along the splines 28, 29 to the pressure chamber 58 reducing the pressure in the pressure chamber 52 and permitting the spring 54 to move the synchronizing mechanism 6 to the right against the bias of the spring 53 and into the unclutched position as shown in Fig. 1.

It will be apparent that the transmission of initial impact and synchronizing torque from the synchronizing means to the main clutch structure through the resiliently connected torque transmitting elements will prevent undue stressing of the synchronizing teeth and will insure smoother engagement of the clutch parts, while the provision of a positive drive between the torque transmitting elements to supersede the resilient drive will insure perfect alignment of the driving clutch parts.

It will be apparent to those skilled in the art that the mechanism herein described provides a new and improved positive synchronising clutch and accordingly accomplishes the objects of the invention. It will also be obvious to those skilled in the art that the illustrated embodiment may be variously changed or modified, or features thereof, singly or collectively, embodied in other combinations than those illustrated without departing from the spirit of the invention or sacrificing all of the advantages thereof and that accordingly the disclosure herein is illustrative only and the invention is not limited thereto.

It is claimed and desired to secure by Letters Patent:

1. In a clutch structure for transmitting rotary motion, the combination comprising: a first rotatable member; a second rotatable member; a positive clutch member slidably mounted on said second rotatable member to rotate therewith, said clutch member being axially movable and engageable with said first rotatable member to connect said first and said second rotatable members in torque transmitting relation; a first torque transmitting element connected for rotatable and axially shiftable movement relative to said second rotatable member; a second torque transmitting element connected for axial movement in unison with and for rotatable movement relative to said first torque transmitting element; means operatively interposed between said first and second torque transmitting elements for determining rotatively adjusted limit positions of said first torque transmitting element relative to said second torque transmitting element to permit engagement of said clutch member with said first rotatable member and for urging said first torque transmitting element away from one of said limit positions; means connecting said second torque transmitting element in axially shiftable and nonrotatable relation with said clutch member; and synchronizing means and positive clutch means operatively interposed between said first torque transmitting element and said first rotatable member to connect said first torque transmitting element and said first rotatable member in torque transmitting relation.

2. In a clutch structure for transmitting rotary motion, the combination comprising: a first rotatable member; a second rotatable member; a clutch member, first connecting means for mounting said clutch member in axially shiftable and nonrotatable relation with said second rotatable member, said clutch member being engageable with said first rotatable member to connect said first and second rotatable members in torque transmitting relation; a first torque transmitting element connected for rotatable and axially shiftable movement relative to said second rotatable member; a second torque transmitting element connected for axial movement in unison with and for rotatable movement relative to said first torque transmitting element; means operatively interposed between said first and second torque transmitting elements for determining rotatively adjusted limit positions of said first torque transmitting element relative to said second torque transmitting element to permit engagement of said clutch member with said first rotatable member and for urging said first torque transmitting element away from one of said limit positions; means connecting said second torque transmitting element in axially shiftable and nonrotatable relation with said clutch member; synchronizing means and positive clutch means operatively interposed between said first torque transmitting element and said first rotatable member to connect said first torque transmitting element and said first rotatable member in torque transmitting relation; first fluid pressure actuating means carried by said second rotatable member for axially shifting said first torque transmitting element into engagement with said first rotatable member; second fluid pressure actuating means carried by said second rotatable member for axially shifting said clutch member into engagement with said first rotatable member; and means including said first connecting means operatively connected with said first and second actuating means for delaying operation of said second actuating means until said first actuating means has caused engagement of said synchronizing means.

3. In a clutch structure for transmitting rotary motion, the combination comprising: a first rotatable member; a second rotatable member; a positive clutch member slidably mounted on said second rotatable member to rotate therewith, said clutch member being axially movable and engageable with said first rotatable member to connect said first and second rotatable members in torque transmitting relation; a first torque transmitting element connected for rotatable and axially shiftable movement relative to said second rotatable member; a second torque transmitting element connected for axial movement in unison with and for rotatable movement relative to said first torque transmitting element; means operatively interposed between said first and second torque transmitting elements, said interposed means comprising a pair of biased telescopic elements to determine rotatively adjusted limit positions of said first torque transmitting element relative to said second torque transmitting element to permit engagement of said clutch member with said first rotatable member and to urge said first torque transmitting element away from one of said limit positions; means connecting said second torque transmitting element in axially shiftable and nonrotatable relation with said clutch member; and synchronizing means and positive clutch means operatively interposed between said first torque transmitting element and said first rotatable member to connect said first torque transmitting element and said first rotatable member in torque transmitting relation.

4. In a clutch structure for transmitting rotary motion, a combination comprising: a first rotatable member; a second rotatable member; a positive clutch member slidably mounted on said second rotatable member to rotate therewith, said clutch member being axially movable and engageable with said first rotatable member to connect said first and second rotatable members in torque transmitting relation; a first torque transmitting element connected for rotatable movement relative to said second rotatable member; first bias means carried by said second rotatable member for urging axial movement of said first torque transmitting element relative to said second rotatable member and said clutch member toward said first rotatable member and for restraining axial movement of said clutch member toward said first rotatable member; a second torque transmitting element connected for axial movement in unison with and in rotatable relation to said first torque transmitting element; means operatively interposed between said first and second torque transmitting elements for determining rotatively adjusted limit portions of said first torque transmitting element relative to said second torque transmitting element to permit engagement of said clutch member with said first rotatable member and for urging said first torque transmitting element away from one of said limit positions; means connecting said second torque transmitting element in axially shiftable and nonrotatable relation with said clutch member; synchronizing means and positive clutch means operatively interposed between said first torque transmitting element and said first rotatable member to connect said first torque transmitting element and said first rotatable member in torque transmitting relation, actuating means carried by said second rotatable member for moving said first torque transmitting element and said clutch member into torque transmitting relation with said first rotatable member, and second bias means carried by said second rotatable member for opposing movement of said torque transmitting element into torque transmitting relation with said first rotatable element.

5. In a clutch structure for transmitting rotary motion, the combination comprising: a first rotatable member; a second rotatable member; a positive clutch member slidably mounted on said second rotatable member to rotate therewith, said clutch member being axially movable and engageable with said first rotatable member to connect said first and said second rotatable members in torque transmitting relation; a first torque transmitting element connected for rotatable and axially shiftable movement relative to said second rotatable member; a second torque transmitting element connected for axial movement in unison with and for rotatable movement relative to said first torque transmitting element; means operatively interposed between said first and second torque transmitting elements for determining rotatively adjusted limit positions of said first torque transmitting element relative to said second torque transmitting element to prevent engagement of said clutch member with said first rotatable member and for urging said first torque transmitting element away from one of said limit positions; means connecting said second torque transmitting element in axially shiftable and nonrotatable relation with said clutch member; synchronizing means and positive clutch means operatively interposed between said first torque transmitting element and said first rotatable member to connect said first torque transmitting element and said first rotatable member in torque transmitting relation; and fluid pressure actuating means carried by said second rotatable member responsive to a first predetermined fluid pressure to operatively connect said first torque transmitting element with said first rotatable member and responsive to a second predetermined fluid pressure in excess of said first predetermined fluid pressure to operatively connect said clutch member with said first rotatable member.

6. In a clutch structure for transmitting rotary motion, the combination comprising: a first rotatable member; a second rotatable member; a clutch member; first connecting means for mounting said clutch member in axially shiftable and nonrotatable relation with said second rotatable member, said clutch member being engageable with said first rotatable member to connect said first and said second rotatable members in torque transmitting relation; a first torque transmitting element connected for rotatable and axially shiftable movement relative to said second rotatable member; a second torque transmitting element connected for axial movement in unison with and for rotatable movement relative to said first torque transmitting element; means operatively interposed between said first and second torque transmitting elements for determining rotatively adjusted limit positions of said first torque transmitting element relative to said second torque transmitting element to permit engagement of said clutch member with said first rotatable member and for urging said first torque transmitting element away from one of said limit positions; means connecting said second torque transmitting element in axially shiftable and nonrotatable relation with said clutch member; synchronizing means and positive clutch means operatively interposed between said first torque transmitting element and said first rotatable member to connect said first torque transmitting element and said first rotatable member in torque transmitting relation; fluid pressure actuating means responsive to a first predetermined fluid pressure to operatively connect said first torque transmitting element with said first rotatable member and responsive to a second predetermined fluid pressure in excess of said first predetermined fluid pressure to operatively connect said clutch member with said first rotatable member; and control means including said first connecting means operatively connected with said fluid pressure actuating means for controlling said first and second predetermined pressures.

ERNEST C. ALLEN.
EDUARD SCHEUERMEIER.

REFERENCES CITED

The following references are of record in the file of this patent:

UNITED STATES PATENTS

| Number | Name | Date |
| --- | --- | --- |
| 1,997,056 | Griswold | Apr. 9, 1935 |

FOREIGN PATENTS

| Number | Country | Date |
| --- | --- | --- |
| 647,456 | Germany | July 5, 1937 |
| 525,615 | Great Britain | Sept. 2, 1940 |